(12) United States Patent
Maxwell

(10) Patent No.: US 6,491,474 B1
(45) Date of Patent: Dec. 10, 2002

(54) WALKING SAND SNARE AND METHOD FOR BEACH RENOURISHMENT

(75) Inventor: Edward Lon Maxwell, Monticello, FL (US)

(73) Assignee: Beach Reclamation, LLC, Albany, GA (US)

(*) Notice: Subject to any disclaimer, the term of this patent is extended or adjusted under 35 U.S.C. 154(b) by 0 days.

(21) Appl. No.: 09/957,420

(22) Filed: Sep. 20, 2001

(51) Int. Cl.[7] ................................................. E02B 3/04
(52) U.S. Cl. ............................. 405/32; 405/16; 405/21; 405/74; 256/12.5
(58) Field of Search ............................. 405/15, 16, 74, 405/32, 21; 256/12.5

(56) References Cited

U.S. PATENT DOCUMENTS

| | | | | |
|---|---|---|---|---|
| 1,969,123 A | * | 8/1934 | Doble | 405/28 |
| 2,877,600 A | * | 3/1959 | Slate | 256/24 |
| 3,486,287 A | * | 12/1969 | Guillon | 52/239 |
| 3,540,587 A | * | 11/1970 | Dawbarn | 210/499 |
| 4,089,179 A | * | 5/1978 | Trautman | 256/12.5 |
| 4,191,361 A | * | 3/1980 | Jensen | 24/460 |
| 4,594,829 A | * | 6/1986 | Herrgord | 52/282.3 |
| 4,690,383 A | * | 9/1987 | Batcheller | 256/24 |
| 5,015,119 A | * | 5/1991 | Schmanski | 256/13.1 |
| 5,584,601 A | * | 12/1996 | Hahn et al. | 405/270 |
| 5,720,573 A | * | 2/1998 | Benedict et al. | 256/12.5 |
| 6,260,828 B1 | * | 7/2001 | English | 256/21 |

* cited by examiner

Primary Examiner—J. J. Swann
Assistant Examiner—Katherine Mitchell
(74) Attorney, Agent, or Firm—J. Wiley Horton

(57) ABSTRACT

A beach renourishment sand snare and a method or its employment. A series of metal posts are embedded in the sand, forming a line which is approximately perpendicular to the shore. Semi-rigid mesh panels are slidably placed and secured between adjacent posts. Each mesh panel, once immersed in the surf, tends to acumulate sand. The sand will eventually accumulate to the point that the shoreline will advance seaward of the mesh panel. Once this occurs the particular mesh panel is removed and transferred to the seaward end of the line of posts. Likewise, the posts on the landward side can be removed and transfered to the seaward side, thereby "walking" the assembly to seaward. The process thereby accumulates sand and advances the shoreline.

8 Claims, 20 Drawing Sheets ated mesh fabric and prevents unwanted immersion in the accumulated sand. Several versions are disclosed, including one where the height of adjacent mesh panels is adjustable somewhat independently (see FIG. 14). FIG. 15 of the Benedict disclosure shows mesh panels mounted in a rigid frame. These panels can presumably be raised and lowered with respect to the support pilings. It is important to realize, however, that the panels are subject to considerable force from wave impact. Ideally the waves travel in a direction which is perfectly perpendicular to the fence, but this is often not the case. It is therefore important to secure the fence panels to the support pilings so that the panels cannot bend and thereby escape the securing device. The arrangement shown in the '573 disclosure obviously does not address this concern. In addition, the '573 disclosure requires the use of bulky external brackets to the support pilings.

FIG. 17 of the '573 disclosure is generally instructive regarding the use of fence structures, as it shows a plan view of several fence structures deployed along a shoreline. The array illustrated is typical of how these devices are used; i.e., a series of several fence structures is needed.

Accordingly, the prior art devices are limited in that they:
1. Require the deployment of pilings or support structures a considerable distance from shore;
2. Do not provide means for preventing the burial of the fence material used,
3. Are insufficiently rigid to resist wave forces; and
4. Require the addition of external brackets on the pilings.

WALKING SAND SNARE AND METHOD FOR BEACH RENOURISHMENT

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of beach and shoreline renourishment. More specifically, the invention comprises a modular water-permeable fence assembly designed to impede the flow of suspended particles—thereby producing sand accretion. A method for deploying the fence assembly is also disclosed.

2. Description of the Related Art

Beach and shoreline erosion is a recognized problem in many areas. Erosion and accretion are natural processes whereby shorelines advance and retreat over time. Where structures are erected on the shoreline, however, the natural erosion jeopardizes property having substantial economic worth.

Various methods have been used to impede or prevent beach erosion. It has long been known that suspending a mesh or net in the water near the beach tends to cause an accumulation of sand in the region of the net. One such device is disclosed in U.S. Pat. No. 3,564,853 to Csiszar (1969) Another approach based on the same concept is disclosed in U.S. Pat. No. 4,089,179 to Trautman (1978). Both these inventions require the deployment of supporting pilings or anchors a considerable distance offshore.

In recent years, efforts have focused on the use of fence structures arrayed in a direction perpendicular to the beach. One such fence structure is disclosed in U.S. Pat. No. 4,710,056 to Parker (1987). The Parker device uses a line of flexible mesh suspended from evenly spaced supports. The supports are actually three-legged structures, with each leg being driven or buried in the sand at an angle for added stability. While the Parker device does succeed in accumulating sand, the mesh employed tends to become buried. Both the buried mesh and the submerged portions of the support legs become exceedingly difficult to remove. The tendency of the fence structures to become submerged and stuck within the sand they accumulate is, in fact, one of the most significant recognized problems with this approach.

U.S. Pat. No. 5,255,997 to Bailey et.al. (1993) provides an excellent explanation of this self-burial phenomenon. FIG. 11 of the Bailey disclosure illustrates mesh panels capable of sliding up and down on their supporting poles. As the text explains, the panels tend to sink within the deposited material (river mud), until their downward progress is checked by restraining straps.

A device which is capable of adjusting the height of the mesh deployed is disclosed in U.S. Pat. No. 5,720,573 to Benedict et.al. (1998). As seen in FIG. 1, the Benedict device incorporates a rigid horizontal rod which spools up

BRIEF SUMMARY OF THE INVENTION

The present invention comprises a beach renourishment sand snare and a method for its employment. A series of metal posts are embedded in the sand, forming a line which is approximately perpendicular to the shore. Each post has a pair of slots cut vertically down its side, with the slots all lining up in a direction which is perpendicular to the shore. Semi-rigid mesh panels are constructed of polymer coated wire mesh. Each side of the mesh panel is enclosed in a clamping assembly. Each clamping assembly is configured to slide into the slots cut into the posts, with means provided to secure the clamping assembly in place in the slot. Thus, a mesh panel may be lowered into place and secured between adjacent posts by sliding the clamping assemblies on either side of the mesh panel into the slots in the two adjacent posts.

A method of applying the sand snare is also disclosed. The placement of the mesh panel in the surf tends to accumulate sand around the panel. The sand will eventually accumulate to the point that the shoreline will advance seaward of the mesh panel. Because each mesh panel is independently placed, once the shoreline has advance past its position, that panel can be removed and transferred to the seaward end of the line of posts. Likewise, the posts on the landward side can be removed and transferred to the seaward side once they are no longer needed—thereby extending the line of posts. In this fashion, a series of posts and mesh panels can be "walked" into the sea, accumulating sand and advancing the shoreline indefinitely.

Figure 1:
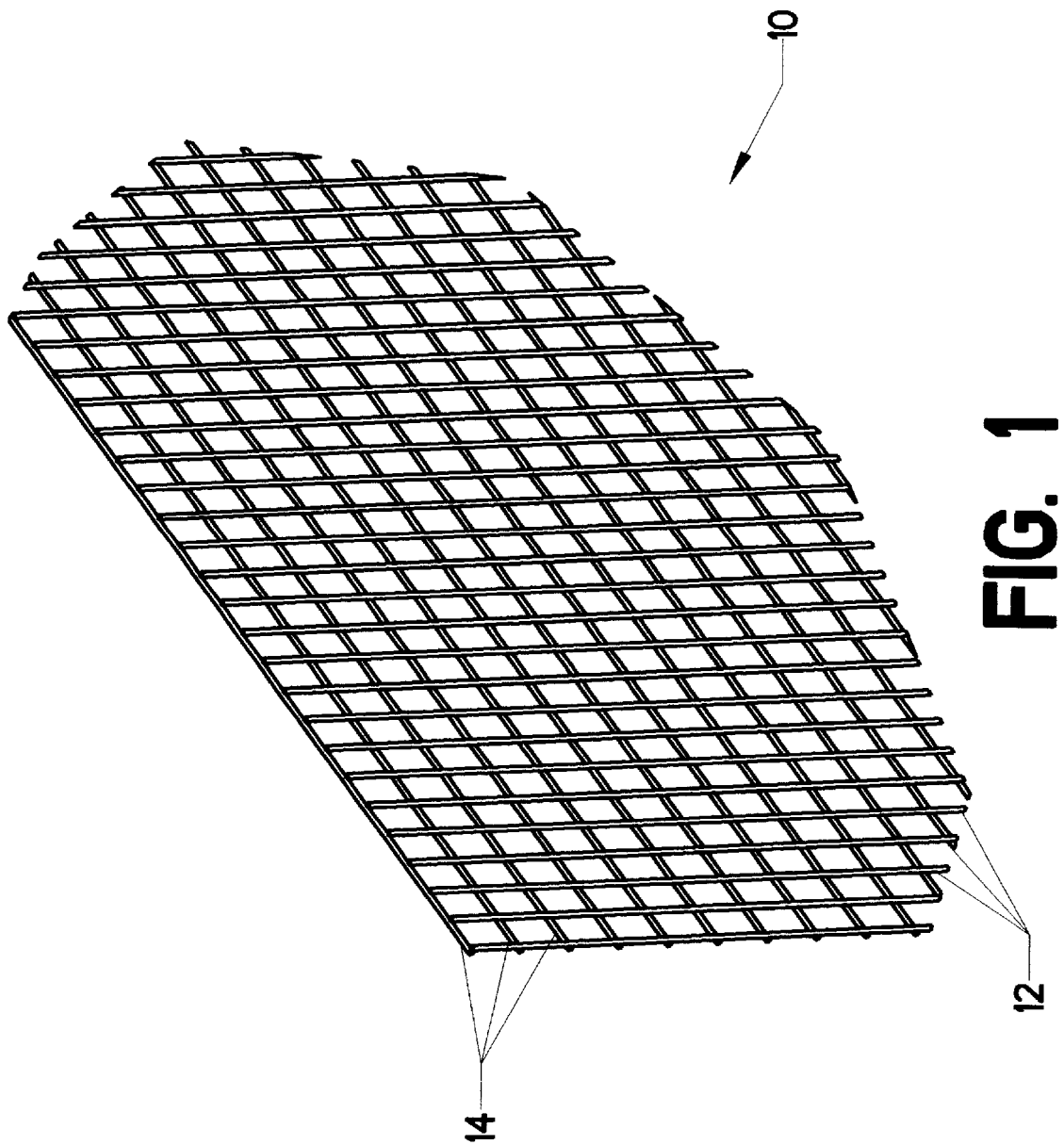
FIG. 1 is an isometric view, showing the wire mesh material.

| REFERENCE NUMERALS IN THE DRAWINGS | |
|---|---|
| 10 mesh panel | 12 vertical rod |
| 14 horizontal rod | 16 welds |
| 18 back bracket | 20 jacking bracket |
| 22 jack member | 24 jack brace |
| 26 fastener hole | 28 female rivet |
| 30 male rivet | 32 post |
| 34 slot | 36 tube brace |
| 38 panel assembly | 40 clamping assembly |
| 42 water | 44 low tide line |
| 46 accumulation zone | 48 alternate back bracket |
| 50 alternate jacking bracket | |

DETAILED DESCRIPTION OF THE INVENTION

Those skilled in the art are aware that suspending a mesh material in the sand-laden water near a beach causes the suspended sand particles to fall out of suspension and accumulate on the bottom Flexible mesh materials have traditionally been used for this purpose, such as nylon nets similar to those used for fishing.

As the sand accumulates over the lower portions of the mesh material, the material becomes imbedded. Flexible netting is often difficult to remove, since the force necessary to pull the netting out of the sand is often sufficient to catastrophically tear the netting. Accordingly, the present invention employs a much more rigid mesh material. FIG. 1 shows a portion of a mesh panel 10. The reader will observe that it is composed of evenly spaced vertical rods 12 joined to evenly spaced horizontal rods 14.

Figure 2:
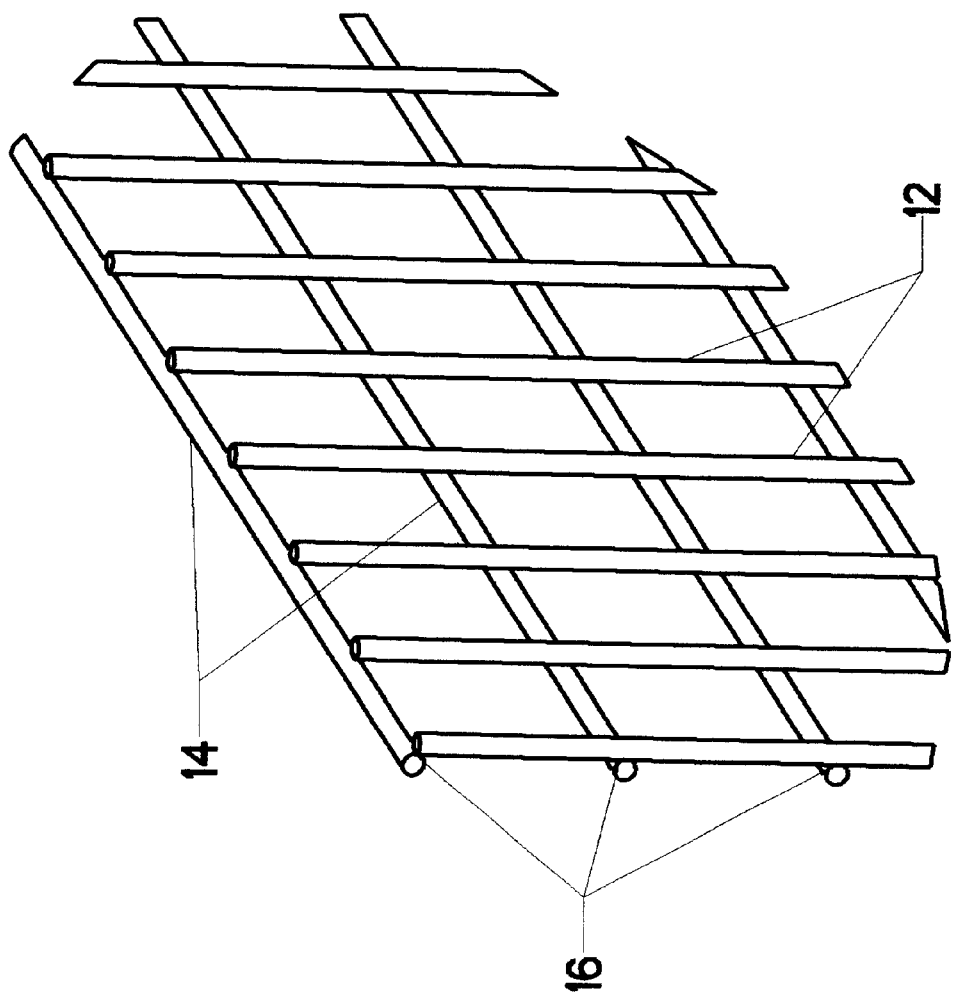
FIG. 2 is an isometric view, showing the wire mesh in greater detail.

FIG. 2 shows mesh panel 10 in greater detail. It is generally composed of steel wire having a diameter between 0.030 and 0.125 inches. The array of horizontal and vertical rods are joined by a series of welds 16. Of course, mesh panel 10 is ultimately destined to be immersed in salt water. It is therefore critical that mesh panel 10 be coated with a corrosion inhibiting substance. One particularly effective method is to coat the completed weldment with synthetic rubber or other flexible and stable polymers. Those skilled in the art will realize that this technique is now employed in the construction of crab traps and the like. The coating prevents the salt water from contacting the metal, yet remains flexible so the coating will not fracture as the mesh twists.

Figure 3:
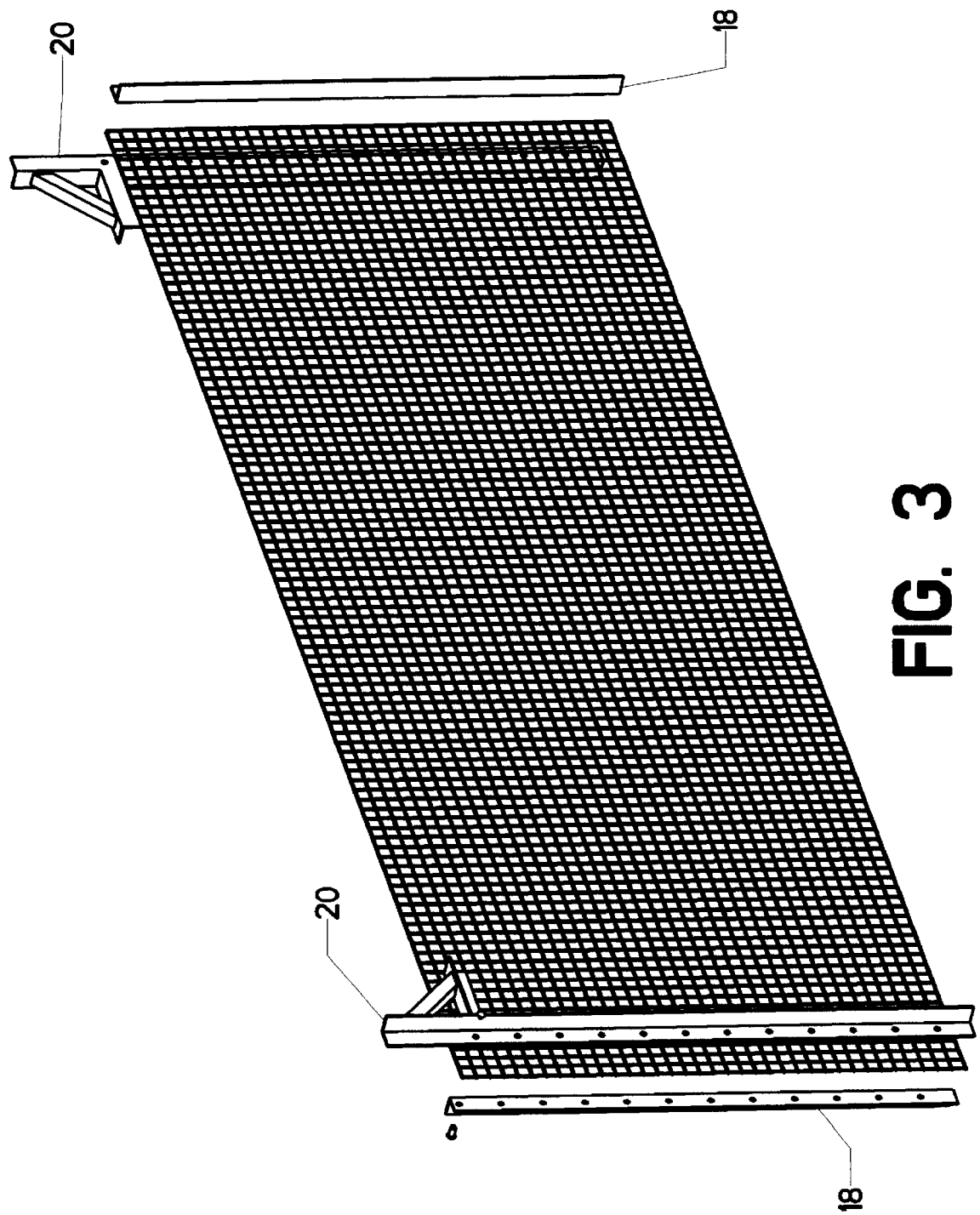
FIG. 3 is an isometric view, showing the application of the clamping assemblies to the wire mesh panel.

FIG. 3 shows the assembly of several components. Mesh panel 10 is generally rectangular, having a lower edge, an upper edge, a first side edge, and a second side edge. The first side edge (to the left in the view as shown) is sandwiched between a back bracket 18 and a jacking bracket 20. Likewise, the second side edge is also sandwiched between a back bracket 18 and a jacking bracket 20. The reader will observe that the relative positions of the two brackets are transposed on opposite ends of mesh panel 10. The reason for this will be explained subsequently.

Figure 4:
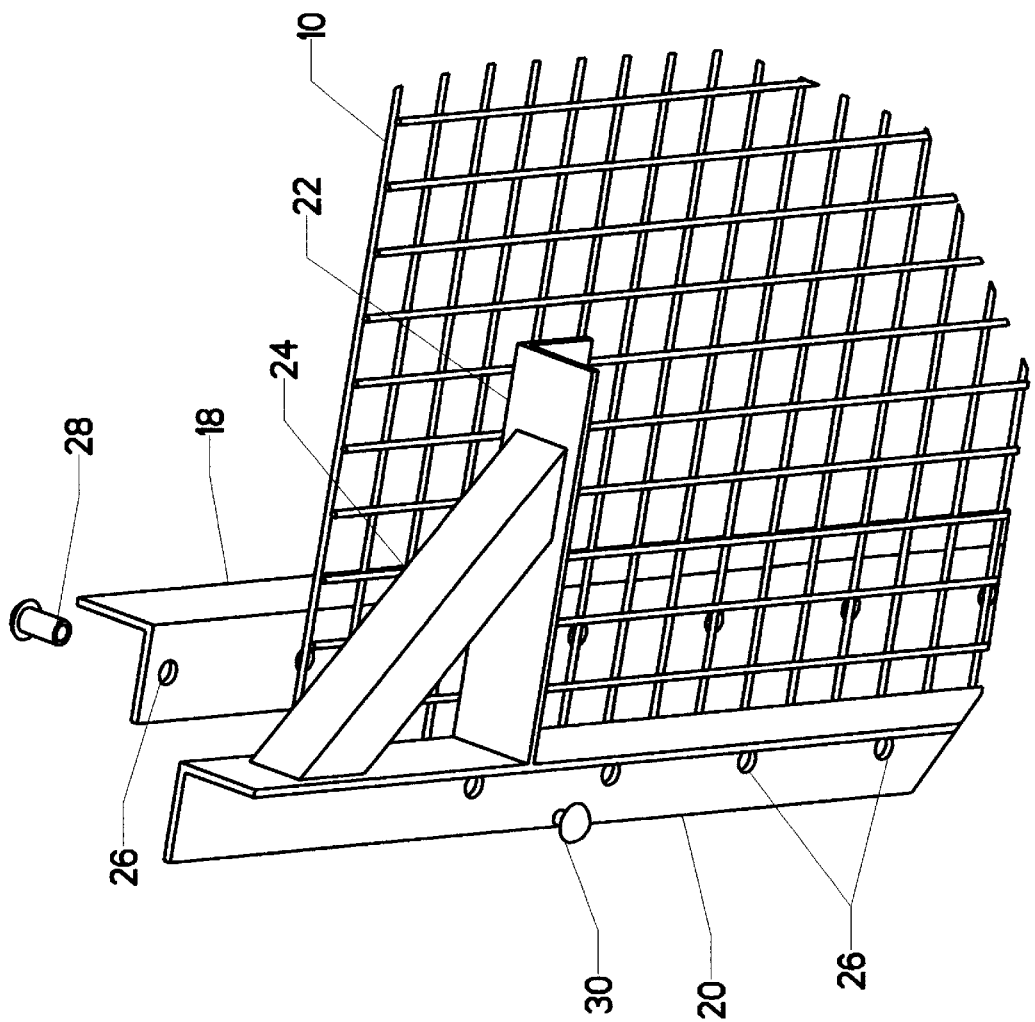
FIG. 4 is an isometric view, showing how the brackets are affixed to the mesh panel

FIG. 4 illustrates one method for joining the brackets to mesh panel 10. Back bracket 18 and jacking bracket 20 are both pierced by a series of fastener holes 26. When the two brackets are placed on opposite sides of mesh panel 10 as shown, these holes align. The holes also align with gaps between the rods comprising mesh panel 10. One method of joining the two brackets to mesh panel 10 is placing rivets within the fastener holes 26 and crimping the rivets in place. Female rivet 28 and male rivet 30 are shown in the appropriate position for insertion. Those skilled in the art will appreciate that many other conventional fastening methods could be used—such as spot welding or crimping.

Figure 5:
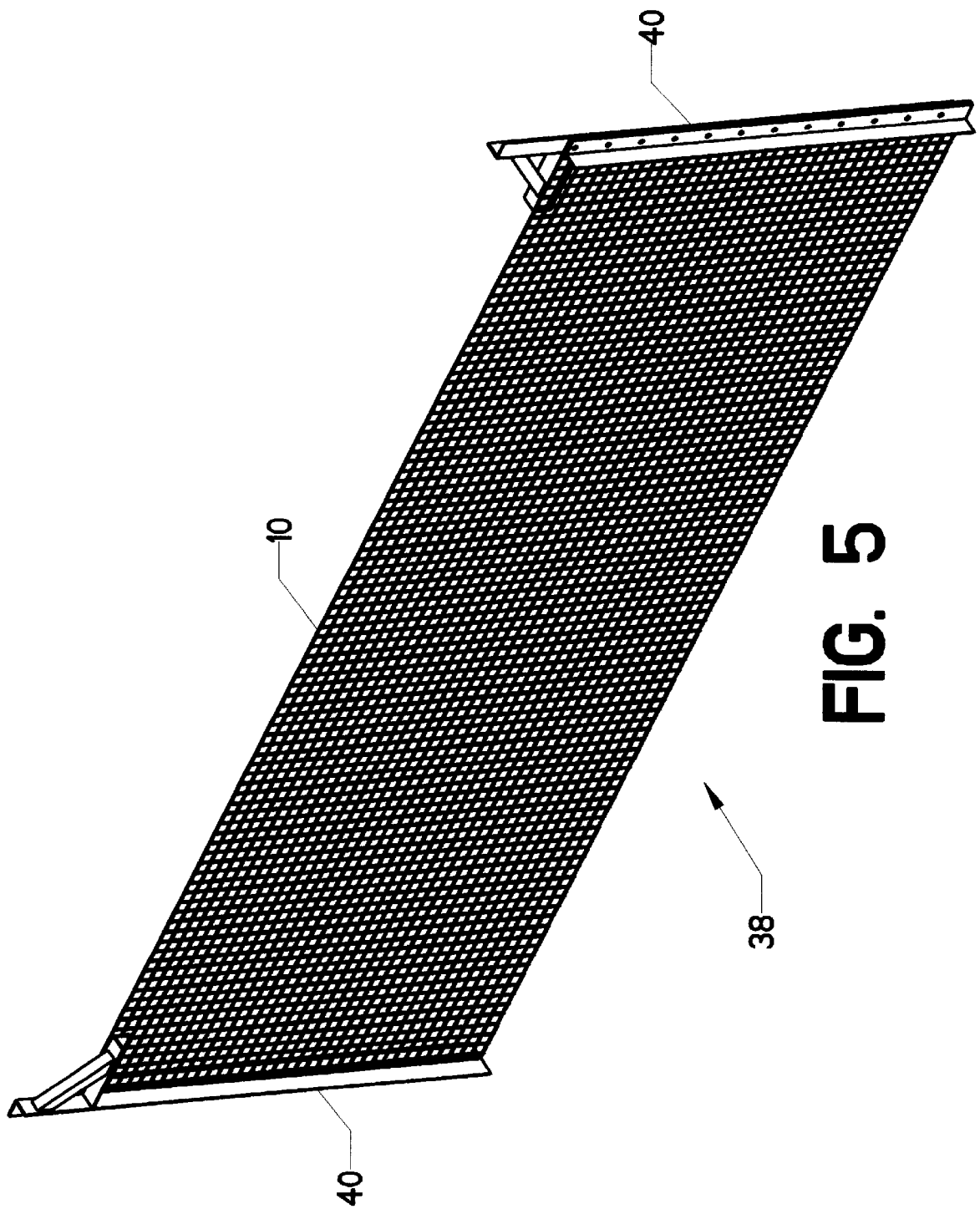
FIG. 5 is an isometric view, showing the completed panel assembly.

FIG. 5 shows the completed panel assembly 38. Each set of back bracket 18 and jacking bracket 20, along with any associated fasteners, is referred to as clamping assembly 40. The reader will observe that both side edges of mesh panel 10 are clamped securely within a clamping assembly 40. In this state, mesh panel 10 may flex somewhat, but it is sufficiently stiff to prevent folding It is desirable to use identical brackets on the first side edge and the second side edge of mesh panel 10. It is therefore necessary to swap the respective positions of back bracket 18 and jacking bracket 20 on the second side edge with respect to the first side edge. In FIG. 5, the clamping assembly 40 on the left side of the view has jacking bracket 20 in the foreground and back bracket 18 in the background. The clamping assembly 40 on the right side of the view has back bracket 18 in the foreground and jacking bracket 20 in the background.

Those skilled in the art will realize that once a particular mesh panel 10 has been in position for several days, its bottom edge will be mired in the accumulated sand. It often requires considerable force to lift mesh panel 10 clear. It is therefore advisable to have designated lift points attached to mesh panel 10. The user can then manually apply force to these lift points or, in the alternative, apply a jacking mechanism.

Returning now to FIG. 4, the lift points will be explained. The reader will observe that the upper portion of jacking bracket 20 has jack member 22 welded to it at a right angle. The purpose of jack member 22 is to provide a horizontal surface to which a lifting force can be applied. Jack brace 24 is provided to reinforce jack member 22. The addition of these elements causes jacking bracket 20 to be taller than back bracket 18. Returning to FIG. 5, the reader will observe that each end of panel assembly 38 is provided with a lift point (though on opposite sides of the panel).

Figure 6:
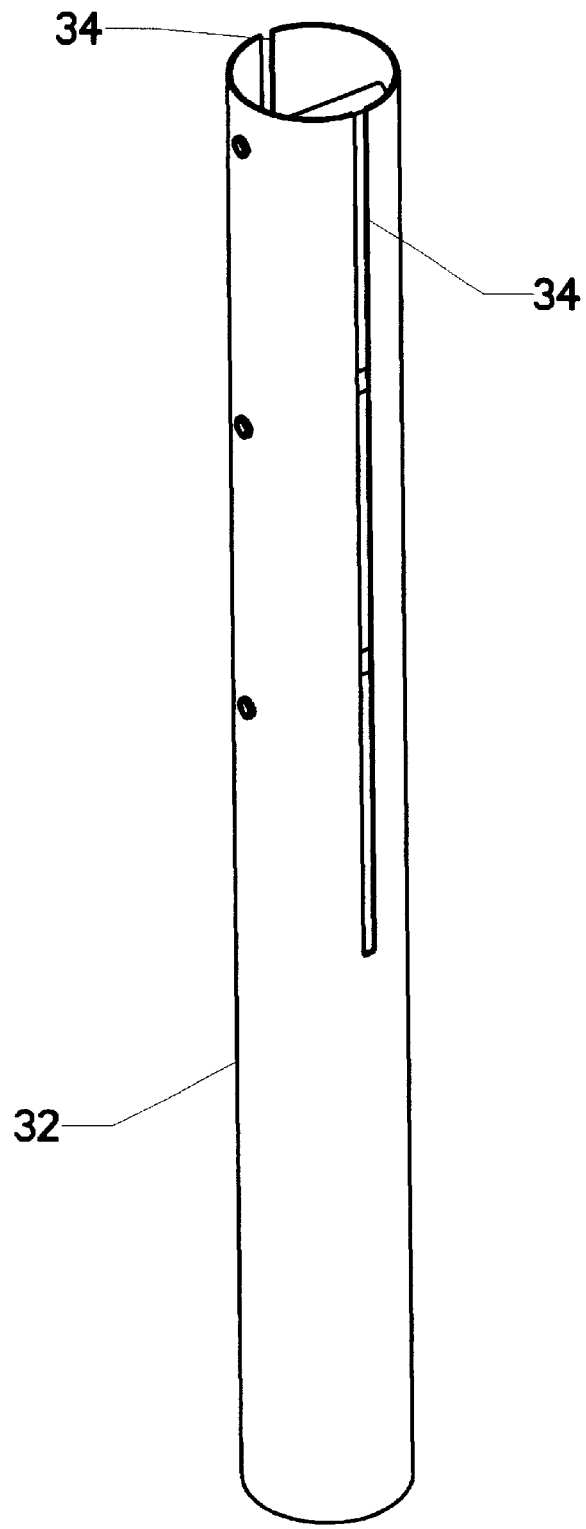
FIG. 6 is an isometric view, showing a post.
Figure 7:
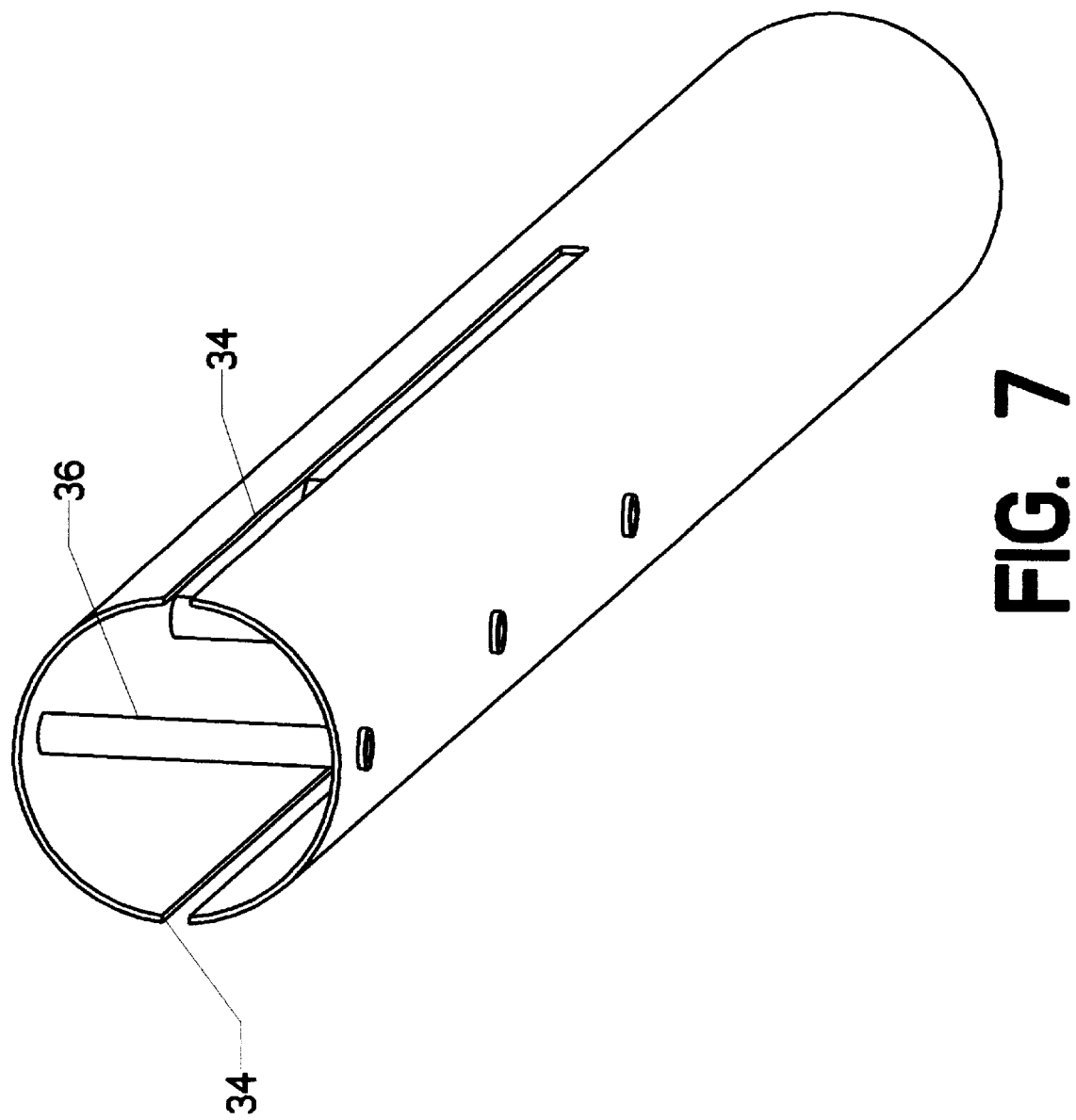
FIG. 7 is an isometric view with a cutaway, showing the rear base.

FIG. 6 shows post 32. Post 32 is typically a hollow metal cylinder. As it must be immersed in salt water, it is advisable to fabricate this element from aluminum or coated steel. The lower portion of post 32 will be driven or dug into the sand during the installation process. The upper portion opens into a pair of vertical slots 34. Those skilled in the art will realize that the addition of vertical slots 34 significantly weakens the structure of post 32. Turning now to FIG. 7, the reader will observe that three tube braces 36 have been added to address this concern. Each tube brace 36 fits within a hole drilled through post 32 from side to side. Once in position, each tube brace 36 is welded in place. A similar result could be obtained using a threaded rod with accompanying nuts and washers. The intent is to reinforce the upper portion of post 32, but the actual method of carrying out this reinforcement is not significant to the present invention.

Figure 8:
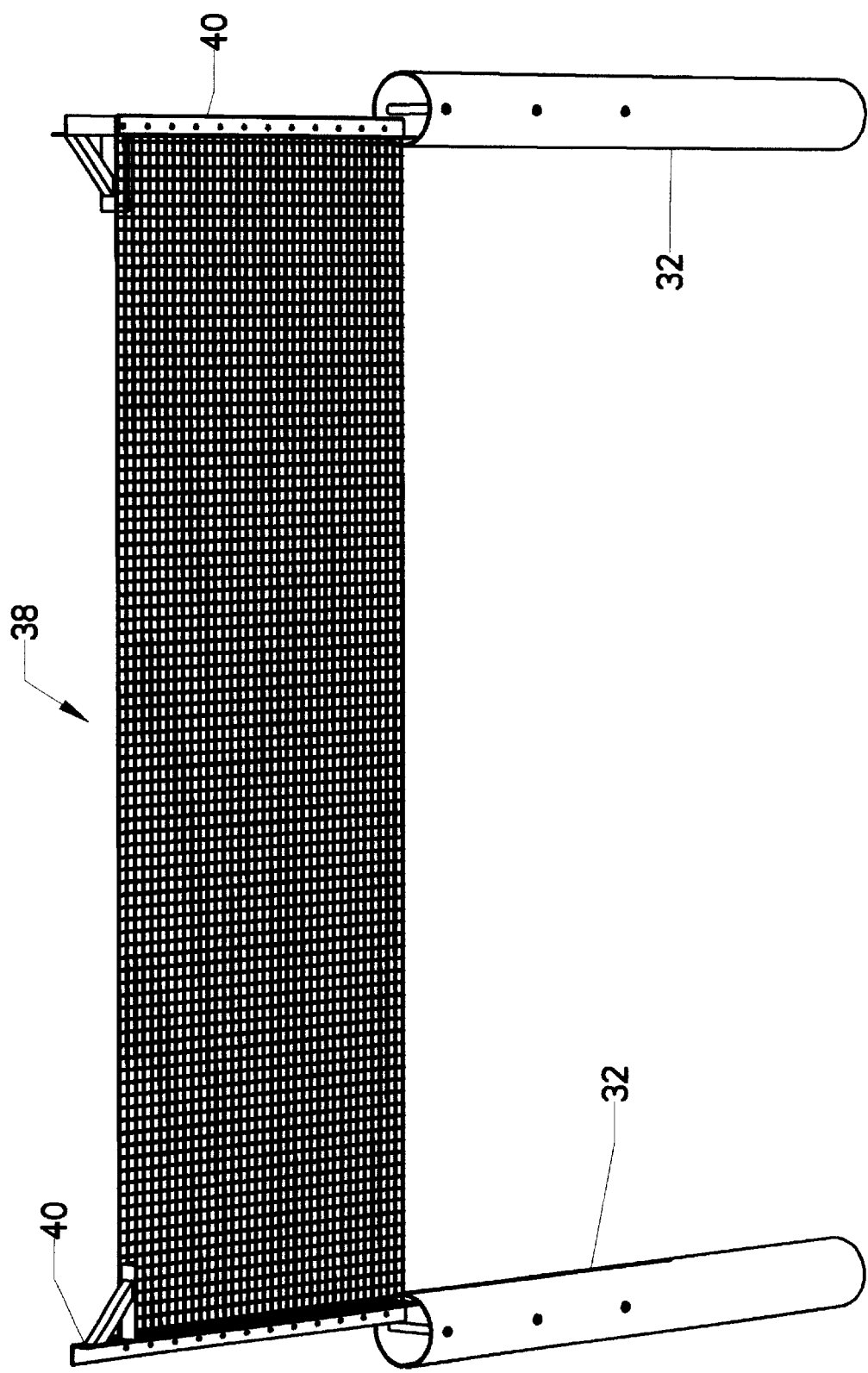
FIG. 8 is a perspective view, showing how a panel assembly slides into adjoining posts.
Figure 9:
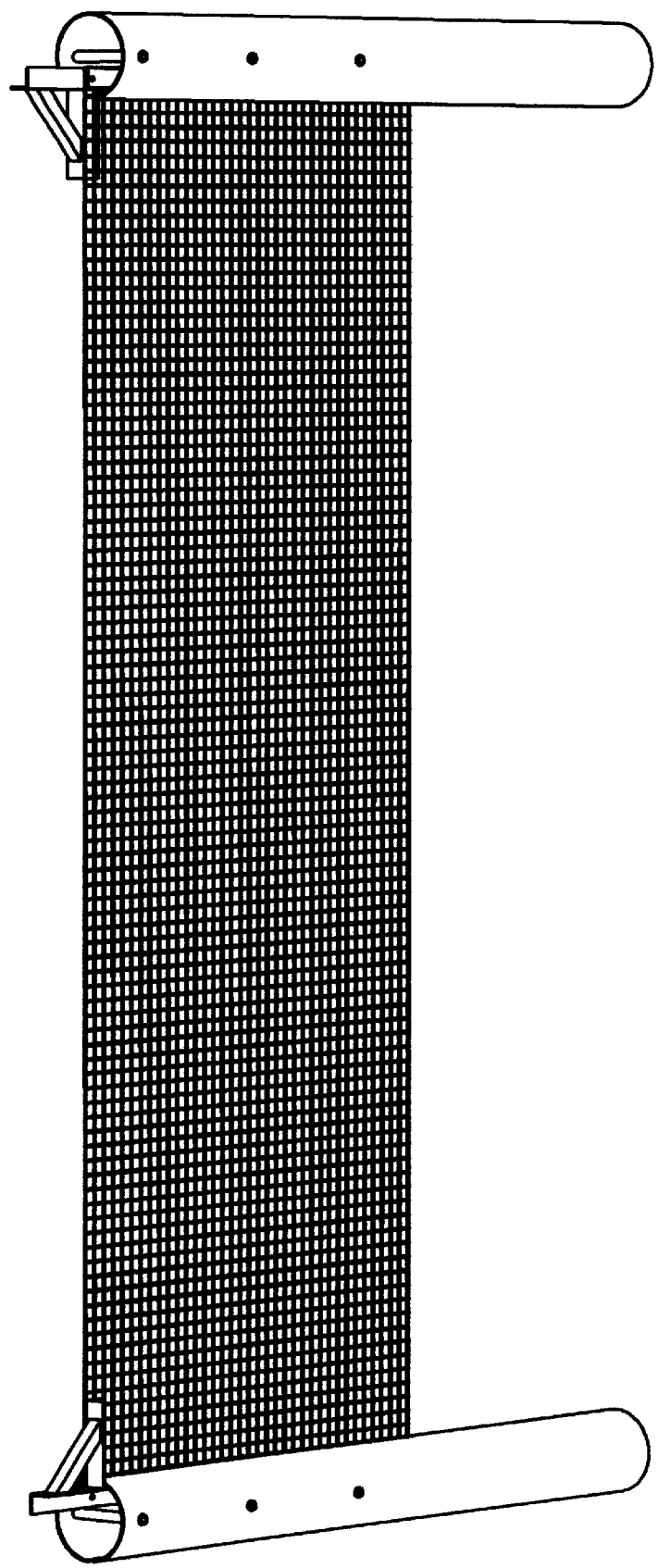
FIG. 9 is a perspective view, showing how a panel assembly slides into adjoining posts.

FIG. 8 illustrates the installation of a panel assembly 40 within a pair of adjacent posts 32. The two clamping assemblies 40 on either end of panel assembly 38 slide into the slots 34 in the two posts 32. Panel assembly 38 is then lowered in the direction indicated by the arrows. FIG. 9 shows the same assembly with panel assembly 38 in the fully installed position.

Figure 10:
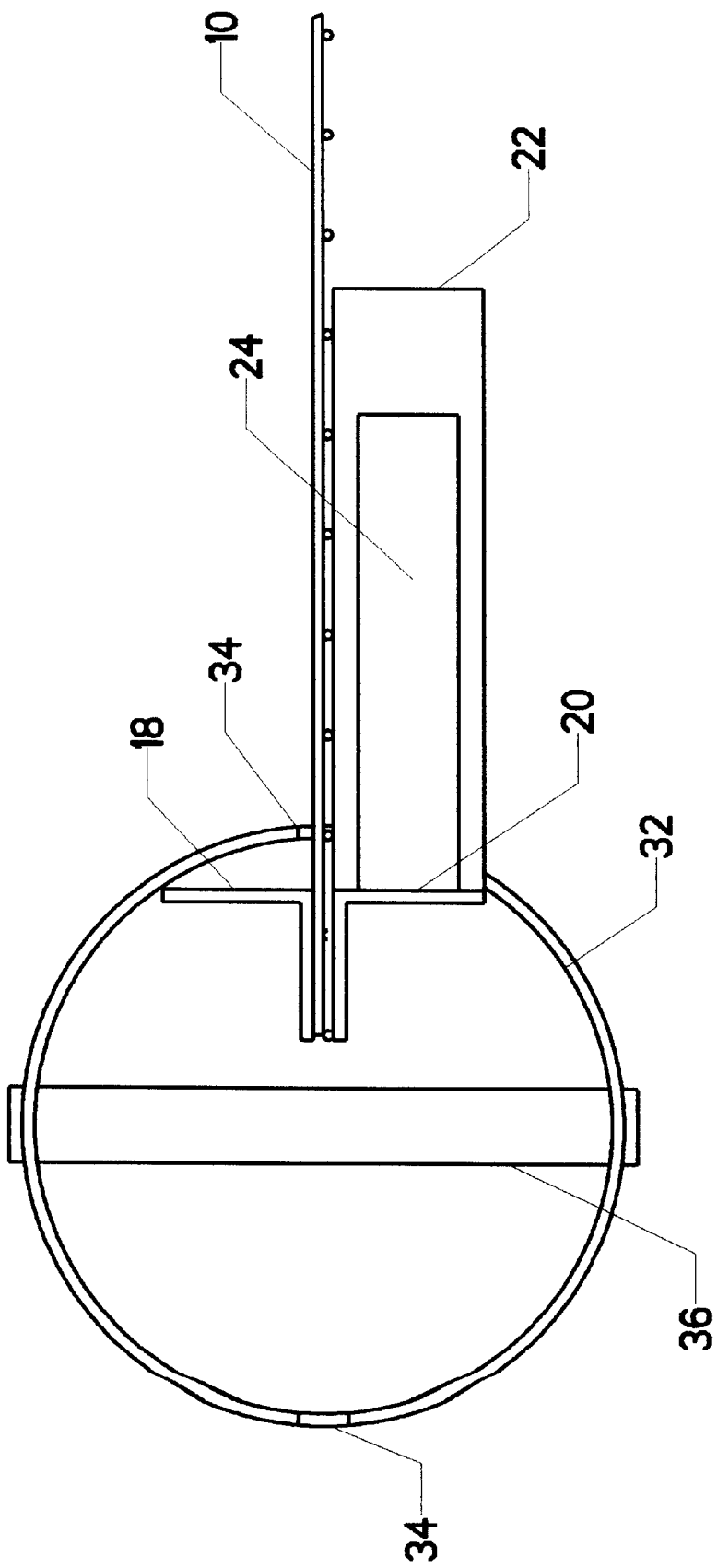
FIG. 10 is a top view of the clamping assembly held within the post.

FIG. 10 shows the left hand post 32 from the top. This view readily illustrates how clamping assembly 40 engages slot 34. The reader will recall that both back bracket 18 and jacking bracket 20 are formed of angle iron (in the shape of the letter "L"). When viewed from the top, each bracket contains a flange which is parallel to mesh panel 10 and a flange which is perpendicular to mesh panel 10. The perpendicular flanges obviously play an important role, as they bear against the interior cylindrical surface of post 32.

Mesh panel 10 is often subjected to substantial lateral wave forces (from top to bottom or from bottom to top in the view as shown). When this occurs, mesh panel 10 comes under significant tension. This tension is transmitted to post 32 by the two flanges (of the two brackets) which extend perpendicularly outward from the plane of mesh panel 10. These perpendicular flanges bear against the interior of post 32. Thus, even under substantial lateral wave forces, mesh panel 10 is unable to pull free of post 32.

The embodiment shown in FIG. 10 places the material of mesh panel 10 in direct contact with slot 34 in post 32. This results in the coating on mesh panel 10 rubbing against the metal of the vertical walls of slot 34 during heavy wave action. The protective coating may eventually rub off under this wave action, causing accelerated corrosion of mesh panel 10.

Figure 18:
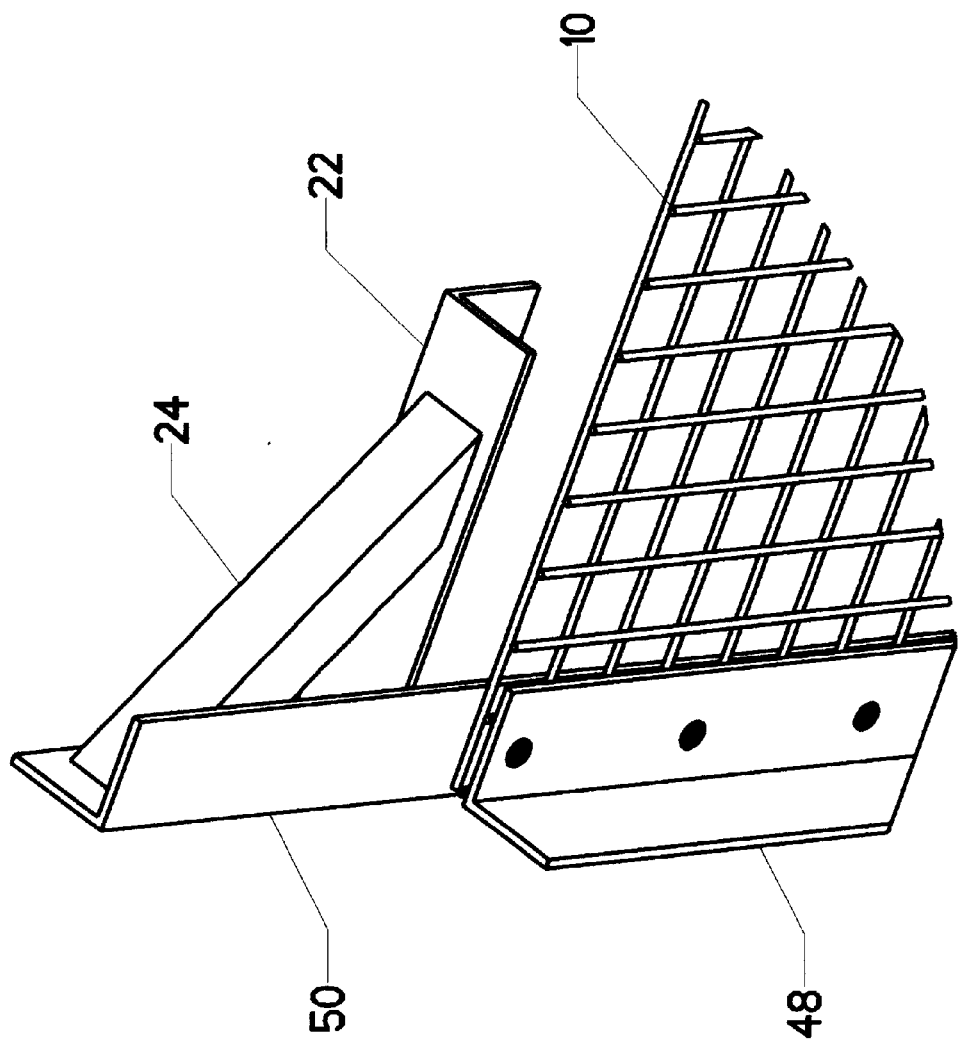
FIG. 18 is an isometric view, showing the preferred embodiment.

The inventor solved this problem by creating an alternate embodiment which has now become the preferred embodiment. FIG. 18 shows this preferred embodiment. The reader will observe that alternate back bracket 48 and alternate jacking bracket 50 are similar to back bracket 18 and jacking bracket 20, with one important exception: the flange on each bracket which is parallel to the plane of mesh panel 10 extends toward the center of mesh panel 10 rather than away from the center of mesh panel 10 (compare particularly FIGS. 4 and 18).

Figure 19:
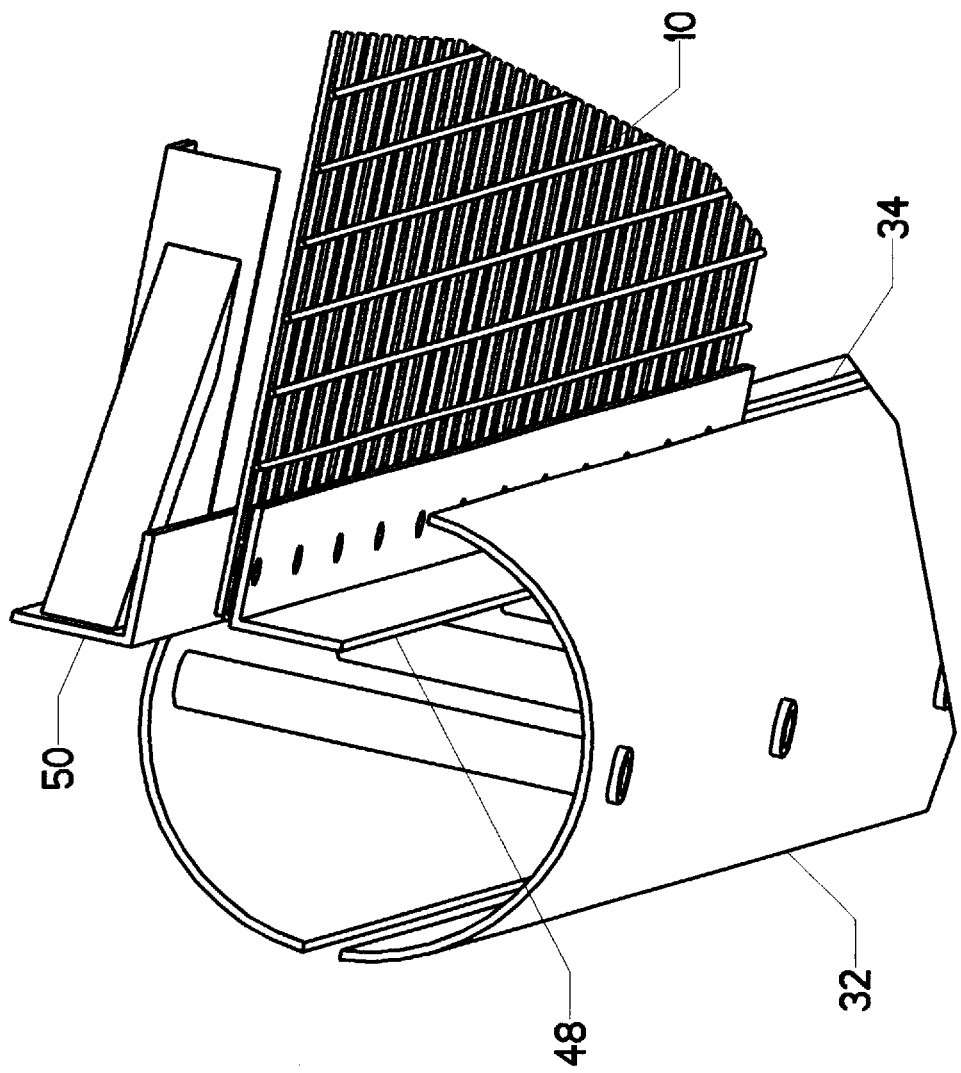
FIG. 19 is an isometric view, showing the installation of the preferred embodiment in a post

FIG. 19 shows the installation of a panel assembly using alternate back bracket 48 and alternate jacking bracket 50 in slot 34 of post 32. Using this configuration, there is no contact between mesh panel 10 and the walls of slot 34. Thus, the abrasion damage to mesh panel 10 is largely eliminated.

Figure 20:
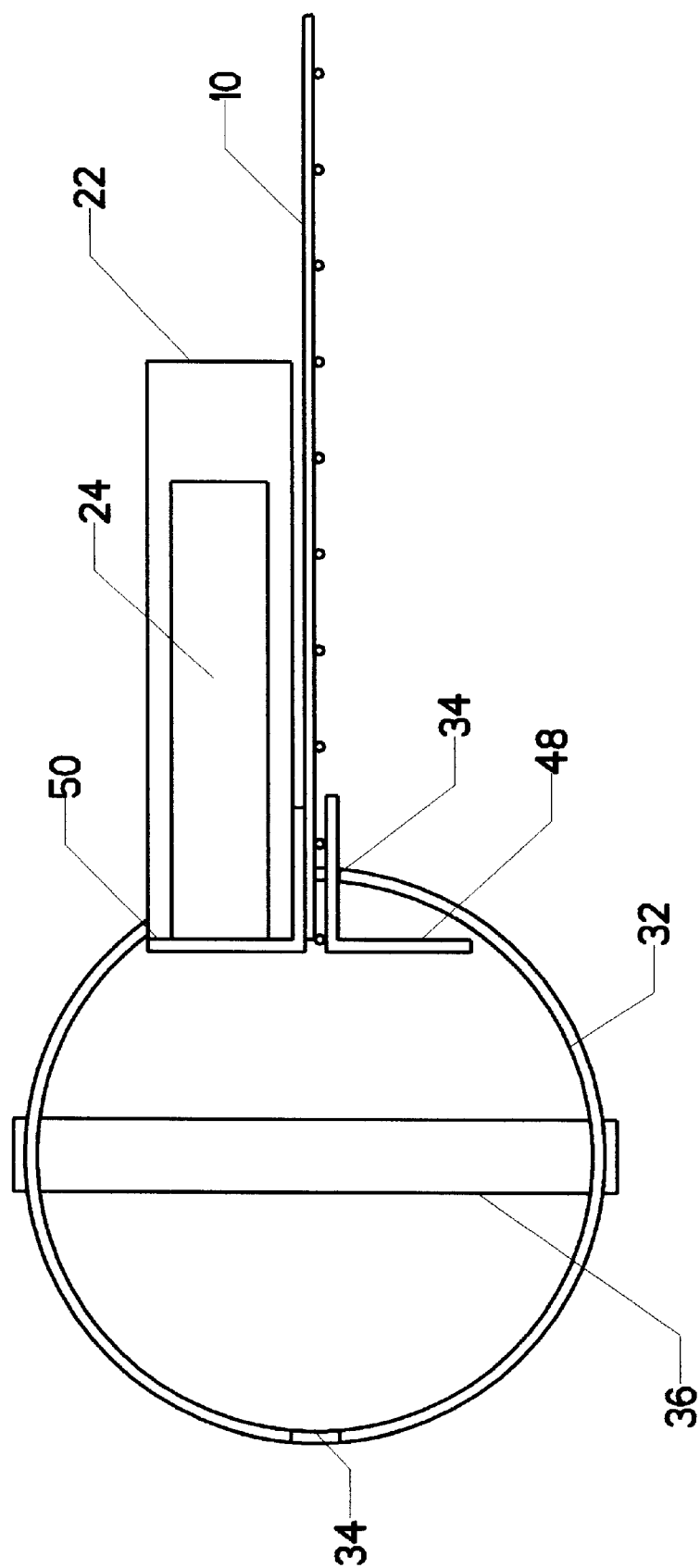
FIG. 20 is a top view, showing the installation of the preferred embodiment in a post

FIG. 20 shows the same assembly from above. In this view, one may more readily observe how the flanges of alternate back bracket 48 and alternate jacking bracket 50 extending in a direction parallel to mesh panel 10 serve to prevent mesh panel 10 from bearing directly against the vertical walls of slot 34. The other features of the two alternate brackets—such as the jacking member—are essentially identical to those features found on the original brackets. Those skilled in the art will appreciate that the fasteners used to join alternate back bracket 48 and alternate jacking bracket 50 together must lie flush with the surfaces of the brackets. Otherwise, the portions of the fasteners which protrude would prevent the device from sliding into slot 34.

Figure 11:
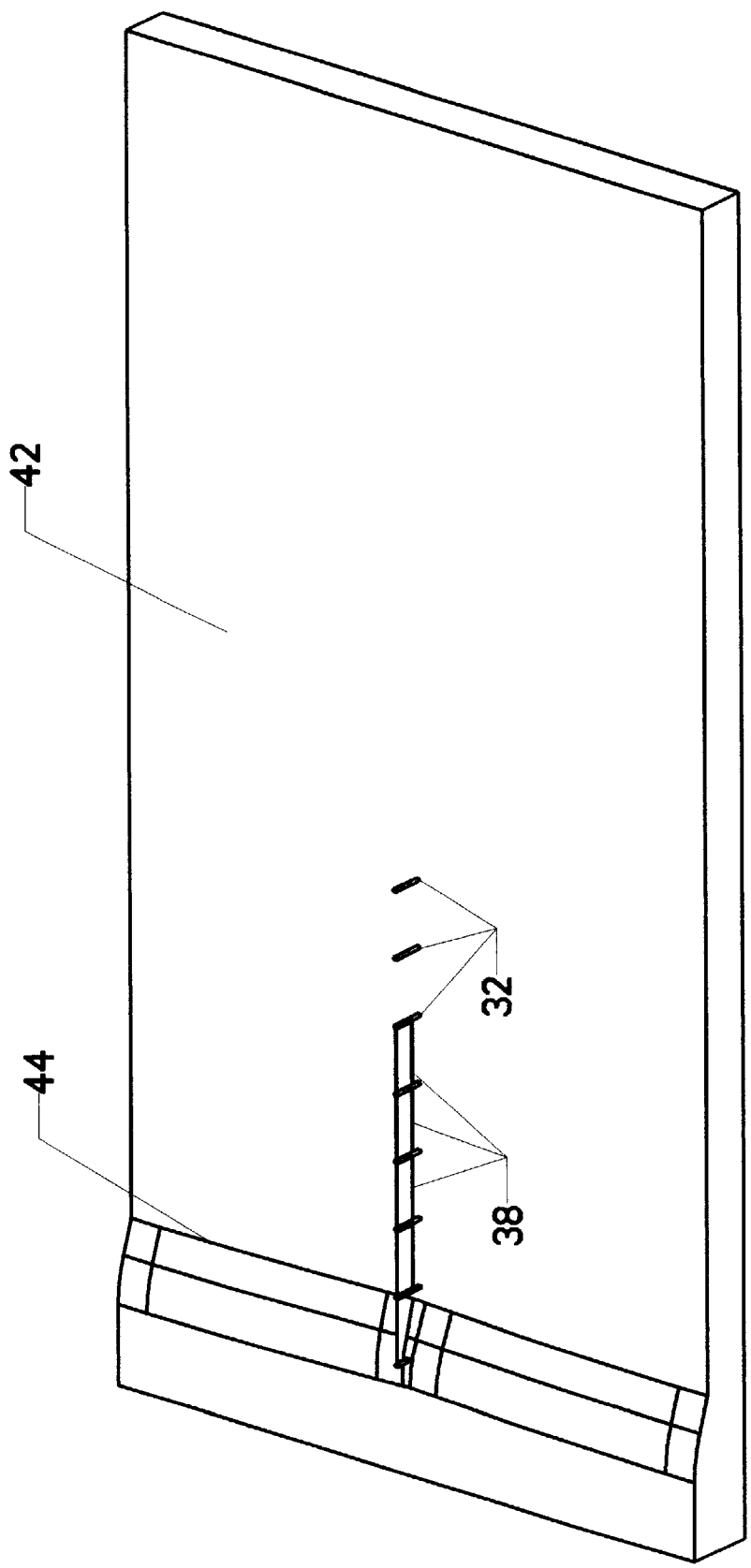
FIG. 11 is an isometric view, showing the application of the device to renourish a beach.

The method of applying the original device disclosed in FIGS. 1 through 10, or the preferred embodiment disclosed in FIGS. 18 through 20, is the same. FIG. 11 illustrates a typical shoreline. Water 44 meets the sand of the beach at low tide line 44. Waves have not been illustrated for purposes of simplicity. However, it is important to keep in mind that waves of varying sizes will typically be approaching the beach from right to left in the view as shown.

A line of posts 32 is embedded in the sand as shown. These posts start to the landward of low tide line 44 and extend to seaward (to the right in the view as shown) out into the water. Several panel assemblies 38 are placed between posts 32 as described previously. Although only a single fence structure is illustrated, those skilled in the art will realize that the structure illustrated is one of a series of such structures arrayed along the beach. Each line of fencing is typically separated by 30 to 200 feet of open space.

Figure 12:
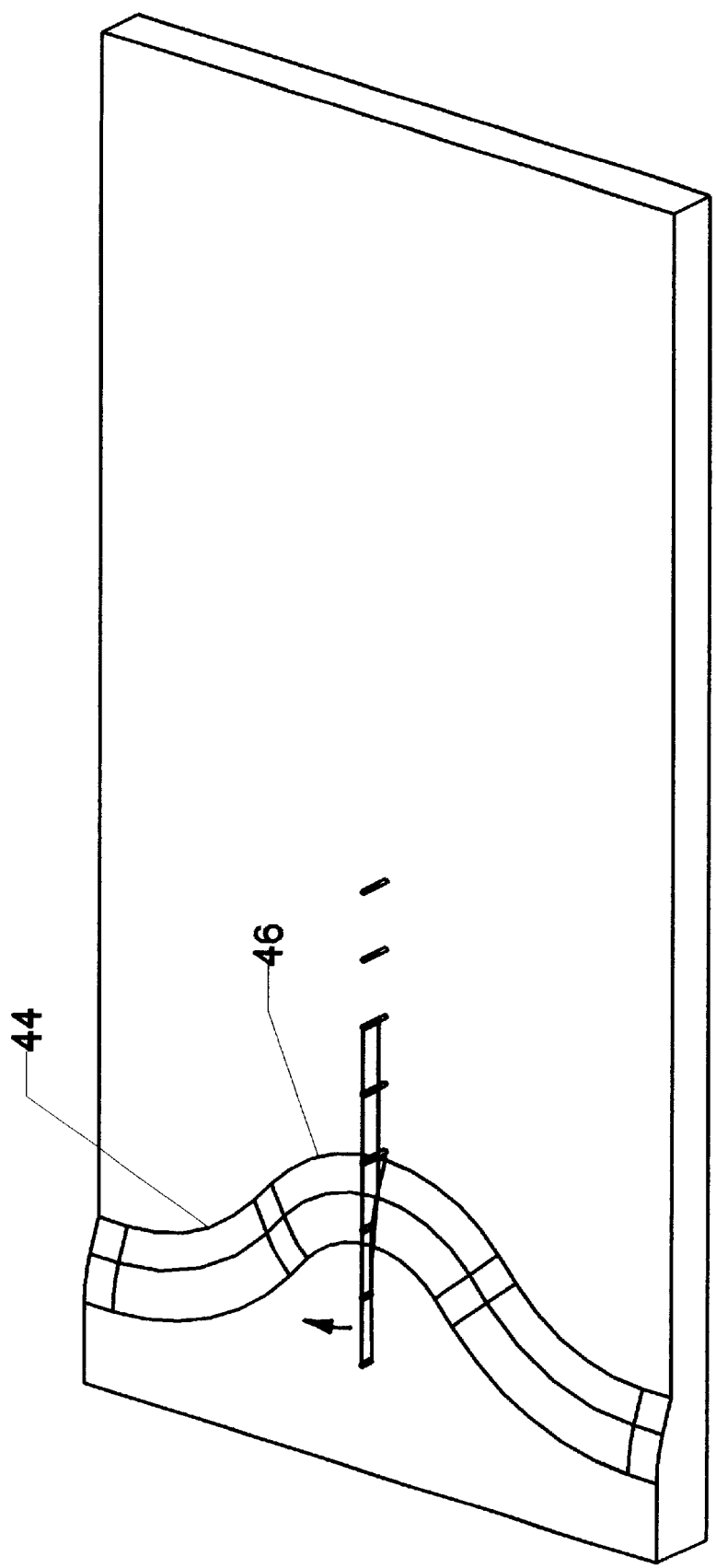
FIG. 12 is an isometric view, showing the renourishment process.

As the tide comes in the series of panel assemblies 38 will become partially submerged. The mesh panel 10 within each panel assembly 38 will tend to cause sand particles suspended in the water to fall out of suspension and accumulate on the bottom. FIG. 12 shows the result of this process. The reader will observe that low tide line 44 has moved to seaward in the vicinity of the fence structure. This region is designated as accumulation zone 46.

The panel assemblies 38 are free to be raised progressively with respect to the line of posts 32 as the sand accumulates. It is also possible to provide means for holding them at a fixed elevation. Practical experience has shown, however, that simply pulling the bottom edge of each panel assembly 38 free of the sand and allowing it to rest again on the sand provides an efficient method of height adjustment without resort to mechanical fixing means. Under optimum sand deposition conditions, this raising of the panel assemblies must be performed every few hours. If the raising operation is not performed regularly, then some panel assemblies 38 may become mired such that the user is incapable of lifting them free. In that case, mechanical jacking devices are applied to the jacking points on each panel assembly 38 to lift them free.

Those skilled in the art will realize that once sand has accumulated to the point shown in FIG. 12, the panel assembly 38 on the left hand extreme (in the view) of the line of posts can be removed and transferred to the right hand end of the line. Each panel assembly 38 is sufficiently rigid and light to be removed, carried, and reinstalled by one person under most circumstances.

Figure 13:
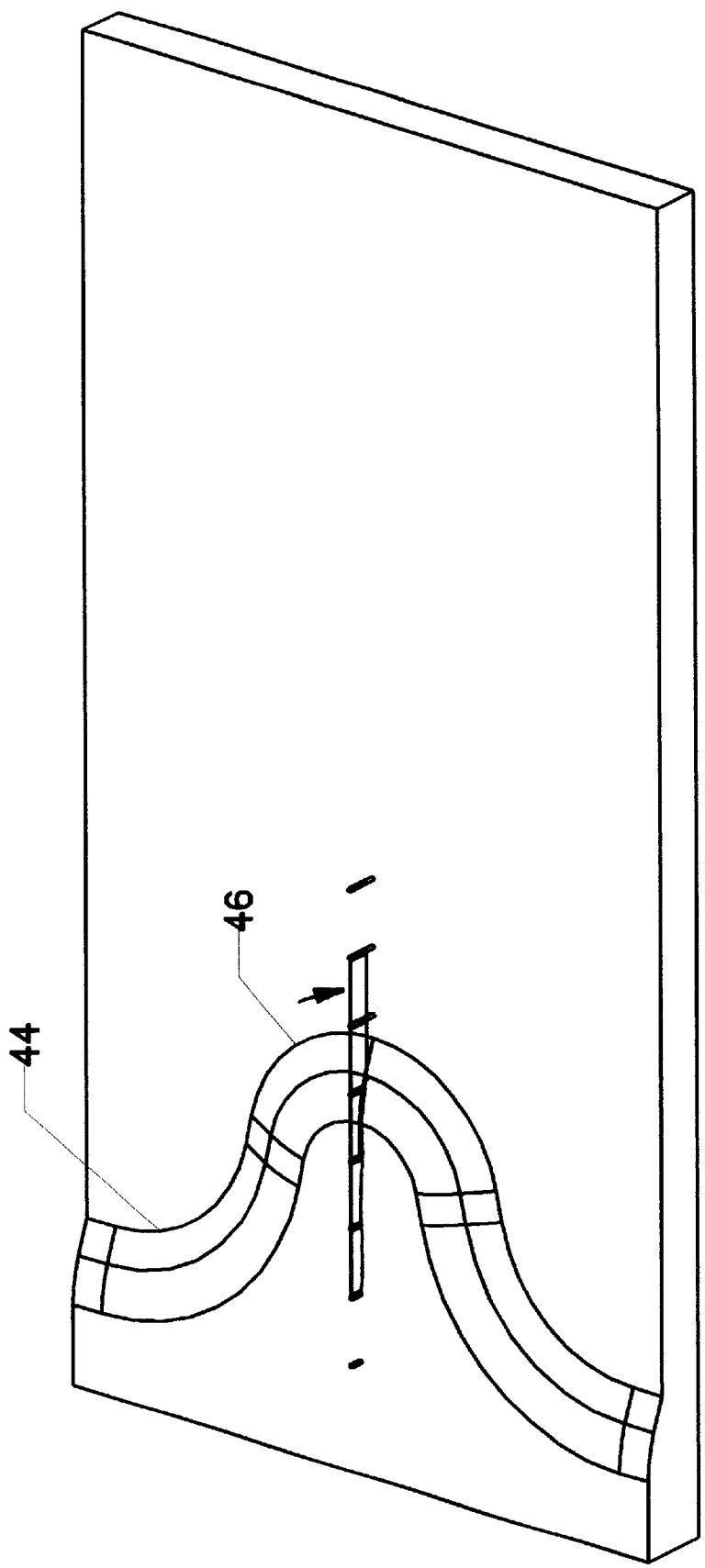
FIG. 13 is an isometric view, showing the renourishment process.

FIG. 13 shows the same fence assembly after one panel assembly 38 has been removed from the left end of the line and added to the right end. Meanwhile, accumulation zone 46 has extended further to the right.

Figure 14:
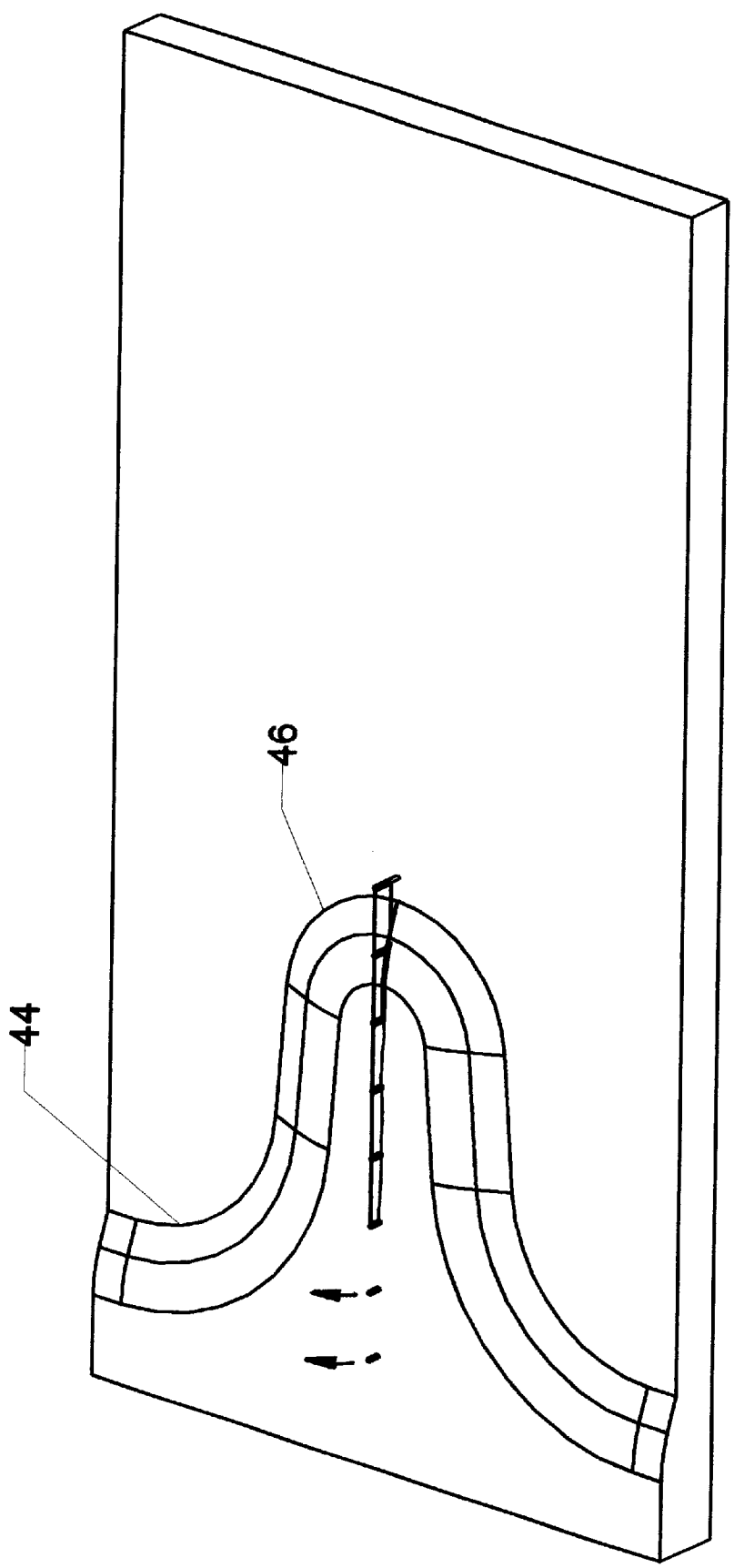
FIG. 14 is an isometric view, showing the renourishment process.

FIG. 14 shows the same fence structure after another panel assembly 38 has been transferred from left to right. At this point, the two posts 32 furthest to landward are no longer needed. Accordingly, these two posts 32 are removed and added to the seaward end of the line (to the right in the view).

Figure 15:
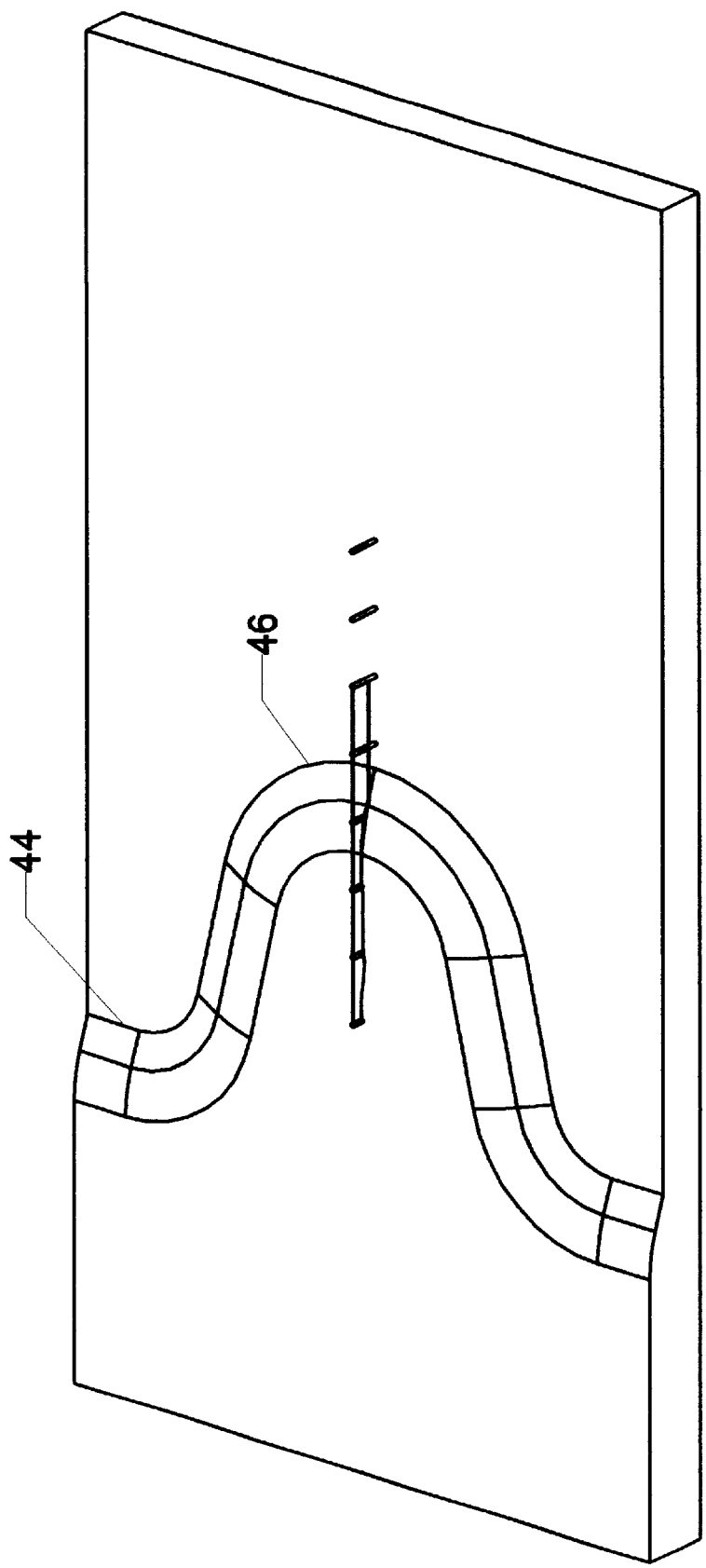
FIG. 15 is an isometric view, showing the renourishment process.
Figure 16:
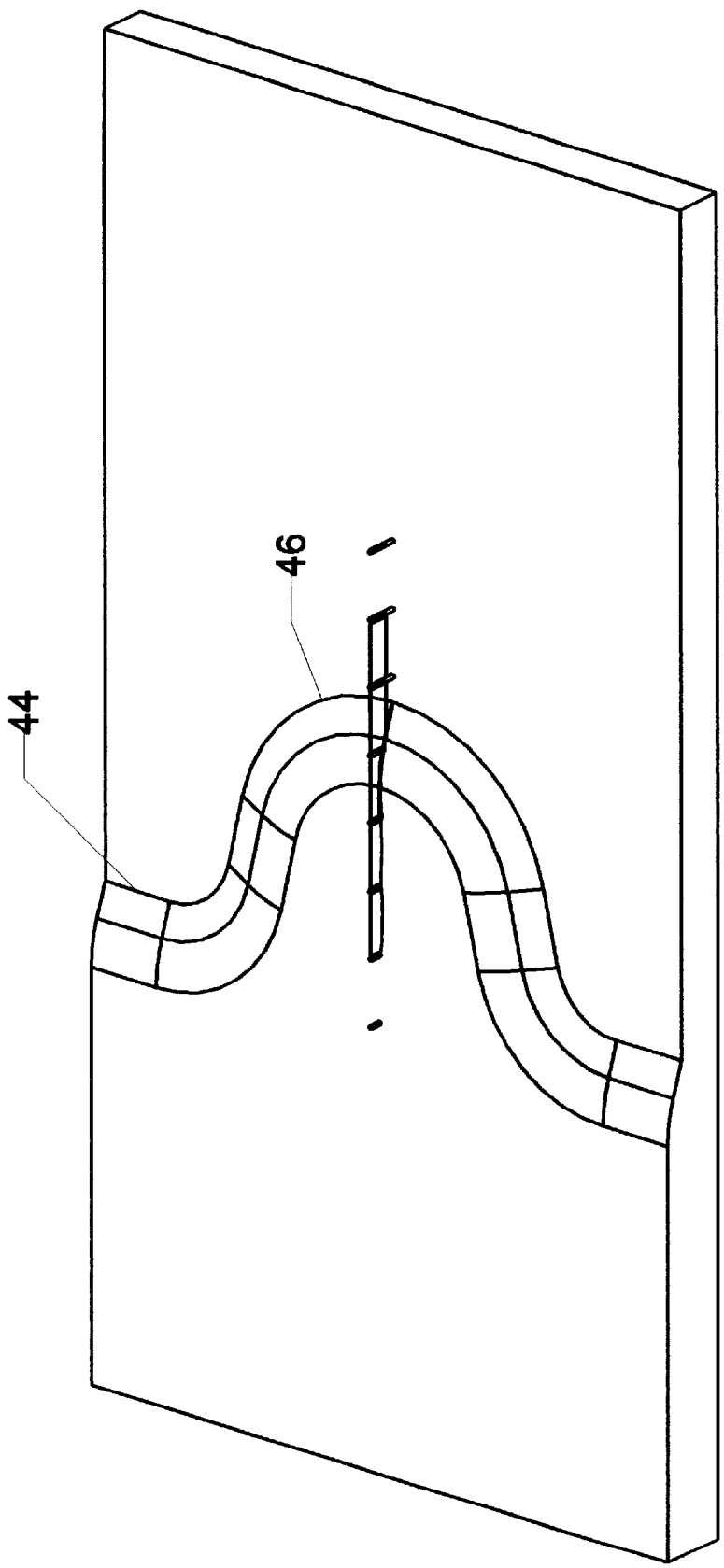
FIG. 16 is an isometric view, showing the renourishment process.

In FIG. 15 the process has continued with the removal and transfer of another post 32 and another panel assembly 38. The deposition process has continued to move accumulation zone 46 to seaward. The process of transferring panel assemblies 38 has continued in FIG. 16.

Figure 17:
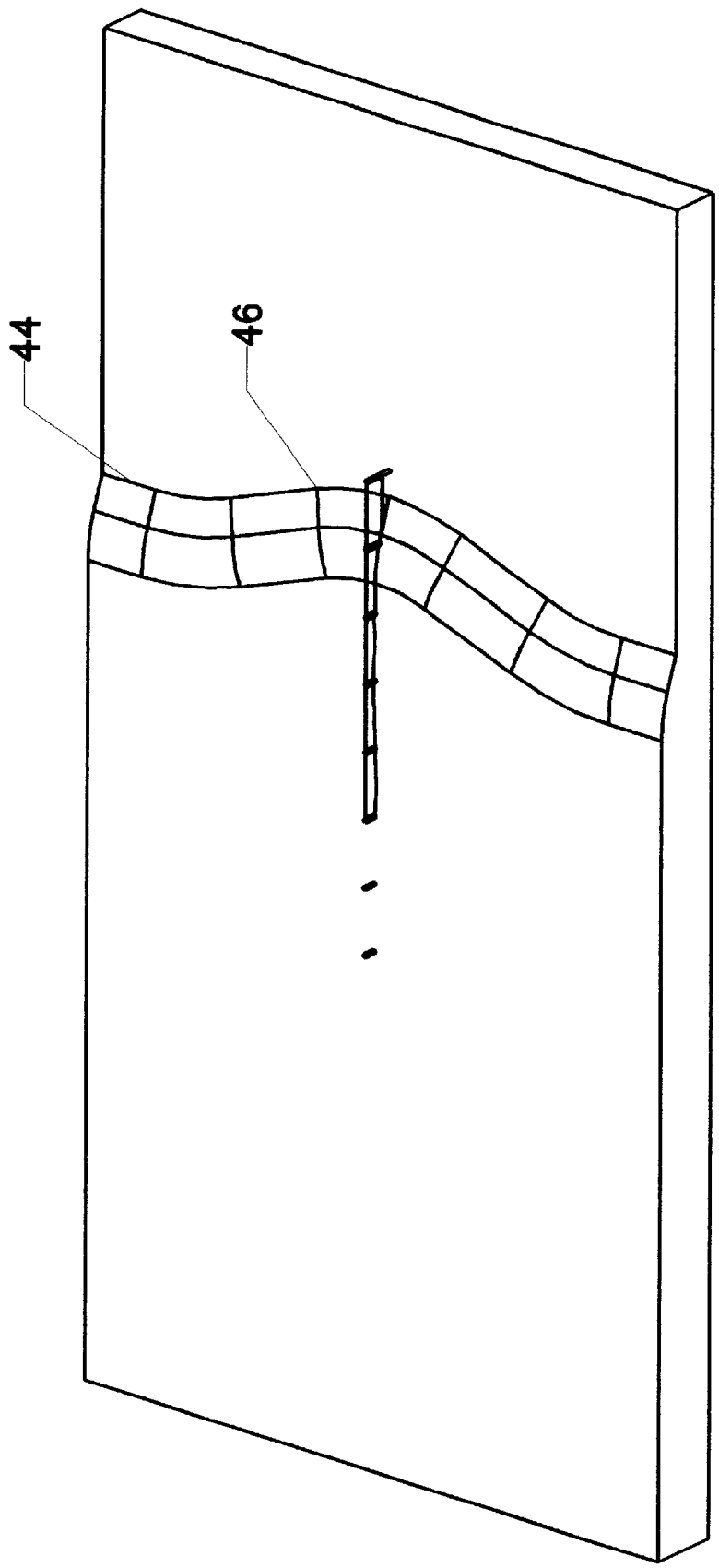
FIG. 17 is an isometric view, showing the renourishment process.

Eventually, low tide line 44 will have been moved seaward to the desired position. The reader must keep in mind that the fence structure shown is one of numerous such structures in parallel. If left in a fixed position, the undulations in low tide line 44 tend to smooth into a uniform shoreline. FIG. 17 illustrates this result. Once the shoreline has stabilized, the entire fence structure is removed—leaving the natural beach.

The reader will therefore appreciate that the modularized nature of the fence structure disclosed allows a user to "walk" the structure out into the sea as the shoreline advances. In this way, the need for extended and unsightly fencing structures is eliminated. The invention has additional advantages in that it:

1. Does not require the deployment of pilings or support structures a considerable distance from shore;
2. Provides means for preventing the burial of the fence material used,
3. Is sufficiently rigid to resist wave forces;
4. Does not require the addition of large external bracket structures on the pilings,
5. Is modular in nature, allowing the fence structure to be "walked" to seaward as the sand accumulates; and
6. Transmits tensile loads placed on the mesh to the posts.

Although the preceding description contains significant detail, it should not be construed as limiting the scope of the invention but rather as providing illustrations of the preferred embodiment of the invention. Thus, the scope of the invention should be fixed by the following claims, rather than by the examples given.

Having described my invention, I claim:

1. A walking sand snare for renourishment of a sand beach by depositing sand suspended in water near said beach upon said beach, comprising:
   a. a line of spaced posts extending into said water in a direction approximately perpendicular to said beach, wherein each of said posts has an upper end and a lower end, and wherein said lower end is embedded into said sand a said upper end opens into a first vertical slot facing said beach and a second vertical slot facing away from said beach,
   b. at least one mesh panel, lying generally in one plane, having a bottom edge, a top edge, a first side proximate said beach, and a second side distal to said beach;
   c. a first clamping assembly affixed to said first side of said at least one mesh panel;
   d. a second clamping assembly affixed to said second side of said at least one mesh panel;
   e. wherein said first clamping assembly is configured to slide within sad second vertical slot of the landward most post of said line of so posts, and said second clamping assembly is configured to slide within said first vertical slot of the next landward most post of said line of spaced posts, thereby suspending said at least one mesh panel between said posts in a manner which a allows a tensile load placed upon said at least one mesh panel to be transmitted to said posts; and
   f. wherein said first and second clamping assemblies are constructed of planar material so as to minimize surface contact between said first and second clamping assemblies and said first and second vertical slots, thereby inhibiting sand deposition and corrosion therebetween.

2. A walking sand snare as disclosed in claim 1, wherein each of said clamping assemblies comprises:
   a. a first flange, extending outward in a direction perpendicular to said plane of said at least one mesh panel;
   b. a second flange, extending outward in a direction perpendicular to said plane of said at least one mesh panel and opposite to said direction of said first flange; and
   c. wherein said first flange and said second flange prevent said clamping assembly from being pulled free of one of said vertical slots in one of said posts of said line of spaced posts.

3. A walking sand snare as disclosed in claim 1, wherein each of said clamping assemblies further comprises a jack member, proximate said top edge of said at least one mesh panel wherein said jack member is capable of transmitting a substantial mechanical force applied to said jack member to said clamping assembly so as to raise said clamping assembly.

4. A walking sand snare as disclosed in claim 1, further comprising means for securing each of said clamping assemblies at a particular elevation within said vertical slot within said post.

5. A walking sand snare as disclosed in claim 1, wherein said at least one mesh panel comprises a matrix of metal rods, locked together and coated with a corrosion inhibiting substance.

6. A walking sand snare as disclosed in claim 1, wherein each of said posts comprises reinforcing means proximate said upper ends of said posts to counteract structural weakening caused by the presence of said vertical slots.

7. A method of renourishing a sand beach by causing the deposit and retention of sand particles suspended in water proximate said beach utilizing a linear fence structure, with said fence structure including a line of posts and a plurality of mesh panels removeably installed between said posts, comprising the steps of:
   a. placing said posts in an evenly spaced line extending from a landward most post, proximate said beach, into said water in a direction approximately perpendicular to said beach, to a seaward most post, distal to said beach;
   b. removeably installing said plurality of mesh panels between said posts, beginning with a first mesh panel proximate said landward most post, and continuing out toward said seaward most post;
   c. as said sand accumulates upon said first mesh panel to the point where it is no longer needed, removing said first mesh panel from said linear fence structure;
   d. thereafter removing said landward most post, transporting it out beyond said seaward most post, and reinstalling it in said line of posts so that said landward most post then becomes the seaward most post and said formerly seaward most post becomes the second seaward most post; and e. thereafter reinstalling said first mesh panel between said seaward most post and said second seaward most post, thereby incrementally moving sand fence structure seaward.

8. A method of renourishing a sand beach by causing the deposit and retention of sand particles suspended in water proximate said beach utilizing a linear fence structure, with said fence structure including a line of posts and a plurality of mesh panels removeably installed between said posts, comprising the steps of:

a. placing said posts in an evenly spaced line extending from a landward most post, approximate said beach, into said water in a direction approximately perpendicular to said beach, to a seaward most post, distal to said beach;

b. removeably installing said plurality of mesh panels between said posts, beginning with a first mesh panel proximate said landward most post, and continuing out toward said seaward most post, but stopping short of said seaward most post so that said seaward most post and a post immediately prior to said seaward most post have no mesh panel suspended between them;

c. as said sand accumulates upon said first mesh panel to the point where it is no longer needed, removing said first mesh panel from said linear fence structure; and d. thereafter reinstaling said first mesh panel between said seaward most post and said post immediately prior to said seaward most post, thereby incrementally moving said fence structure seaward.

* * * * *